United States Patent Office 3,829,433
Patented Aug. 13, 1974

3,829,433
SUBSTITUTED PIPERIDINOALKANONE
OXIME DERIVATIVES
Albert A. Carr, Cincinnati, C. Richard Kinsolving, Terrace Park, and Donald R. Meyer, Cincinnati, Ohio, assignors to Richardson-Merrell Inc., New York, N.Y.
No Drawing. Filed Jan. 28, 1972, Ser. No. 221,822
Int. Cl. C07d 29/28
U.S. Cl. 260—293.79
12 Claims

ABSTRACT OF THE DISCLOSURE

Novel compounds useful as antihistamine agents, antiallergy agents, and bronchodilators are represented by the following formula

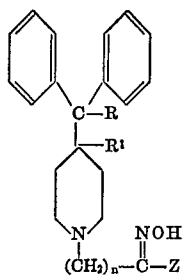

wherein R represents hydrogen or hydroxy; $R^1$ represents hydrogen; or R and $R^1$ taken together form a second bond between the carbon atoms bearing R and $R^1$; $n$ is a positive whole integer of from 1 to 3; Z represents thienyl, phenyl, or substituted phenyl wherein the substituents on the substituted phenyl may be attached at the ortho, meta, or para positions of the phenyl ring and are selected from halogen, a straight or branched lower alkyl chain of from 1 to 4 carbon atoms, a lower alkoxy group of from 1 to 4 carbon atoms, a di(lower)alkylamino group, or a saturated monocyclic heterocyclic group such as pyrrolidino, piperidino, morpholino, or N-(lower)alkylpiperazino. Pharmaceutically acceptable acid addition salts and individual geometric isomers of compounds of the above formula are also included as a part of this invention.

FIELD OF INVENTION

This invention relates to novel substituted-piperidinoalkanone oxime derivatives. More particularly this invention relates to 4-diphenylmethyl-, 4-(α-hydroxy-α-phenylbenzyl)-, and 4 - diphenylmethylenepiperidinoalkanone oxime derivatives which are useful as antihistamines, antiallergy agents and bronchodilators and to methods of making and using the same.

SUMMARY OF INVENTION

The novel substituted piperidine derivatives of this invention useful as antihistamines, antiallergy agents, and bronchodilators are represented by the formula

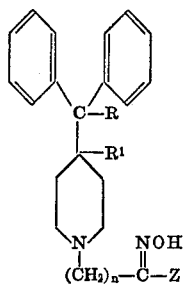

Formula I wherein R represents hydrogen or hydroxy; $R^1$ represents hydrogen; or R and $R^1$ taken together form a second bond between the carbon atoms bearing R and $R^1$, $n$ is a positive whole integer of from 1 to 3; Z represent thienyl, phenyl or substituted phenyl wherein the substituents on the substituted phenyl are selected from an halogen atom, such as chlorine, fluorine, bromine, or iodine, a straight or branched lower alkyl chain of from 1 to 4 carbon atoms, a lower alkoxy group of from 1 to 4 carbon atoms, a di-(lower)alkylamino group, or a saturated monocyclic heterocyclic group such as pyrrolidino, piperidino, morpholino, or N-(lower)alkylpiperazino and may be attached at the ortho, meta, or para positions of the phenyl ring. Included in the scope of this invention are the pharmaceutically acceptable acid addition salts and individual geometric isomers of the compounds of Formula I.

DETAILED DESCRIPTION OF INVENTION

It can be seen from the above Formula I that compounds of this invention may be 4-diphenylmethylpiperidine derivatives as represented by the following Formula II, 4 - (α - hydroxy - α - phenylbenzyl)piperidine derivatives as represented by the following Formula III, or 4-diphenylmethylenepiperidine derivatives as represented by the following Formula IV.

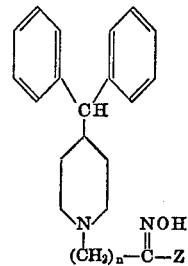

Formula II

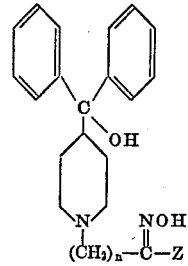

Formula III

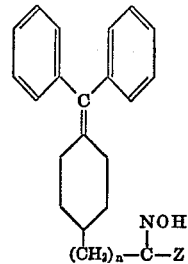

Formula IV

In the above Formulas II, III and IV, $n$ and Z have the same meanings as defined hereinbefore.

The term lower alkyl as used in describing the compounds of this invention is taken to mean a straight or branched alkyl chain of from 1 to 4 carbon atoms. As examples of lower alkyl groups that may be present in the compounds of Formulas I to IV as a straight or branched lower alkyl substituent, or in the di(lower)alkylamine substituent, or in the N-(lower)alkylpiperazine substituent on Z when Z represents a substituted phenyl there may be mentioned, methyl, ethyl, n-propyl, n-butyl, isopropyl, isobutyl and tert-butyl.

The preferred compounds of this invention are those of general Formulas III and IV wherein n and Z have the meanings defined hereinbefore, and may be represented by the following general Formula V. These compounds have superior antihistamine and antiallergy properties and are bronchodilators. In addition these compounds lack central nervous system stimulant and depressant effects, thus making them particularly useful as antihistamine and antiallergy agents and as bronchodilators.

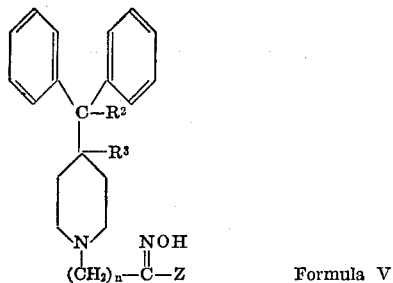

Formula V

In the above Formula V, $R^2$ represents hydroxy, and $R^3$ represents hydrogen, or $R^2$ and $R^3$ taken together form a second bond between the carbon atoms bearing $R^2$ and $R^3$; n is a positive whole integer of from 1 to 3; and Z represents thienyl, phenyl, or substituted phenyl wherein the substituents on the substituted phenyl may be attached at the ortho, meta, or para positions of the phenyl ring and are selected from a halogen atom, such as, chlorine, fluorine, or bromine, a straight or branched lower alkyl chain of from 1 to 4 carbon atoms, a lower alkoxy group of from 1 to 4 carbon atoms, a di(lower)alkylamino group, or a saturated monocyclic heterocyclic group such as pyrrolidino, piperidino, morpholino, or N-(lower)alkylpiperazino.

The more preferred compounds of this invention are those of the above general Formula V wherein n is equal to 3.

This invention also includes the pharmaceutically acceptable acid addition salts of the compounds of the hereinbefore set forth formulas, geometric isomers and salts thereof. Pharmaceutically acceptable acid addition salts of the compounds of this invention are those of any suitable inorganic or organic acid. Suitable inorganic acids are, for example, hydrochloric, hydrobromic, sulphuric, phosphoric acids and the like. Suitable organic acids include carboxylic acids such as, for example, acetic, propionic, glycolic, lactic, pyruvic, malonic, succinic, fumaric, malic, tartaric, citric, ascorbic, maleic, hydroxymaleic, and dihydroxymaleic, benzoic, phenylacetic, 4-aminobenzoic, 4-hydroxybenzoic, anthranilic, cinnamic, salicyclic, 4-aminosalicyclic, 2-phenoxybenzoic, 2 - acetoxybenzoic, mandelic acid and the like, sulfonic acids such as, for example, methanesulfonic, ethanesulfonic, β-hydroxyethanesulfonic acid, and the like.

As examples of compounds illustrative of this invention there may be mentioned, for example:

4′-fluoro-4-(4-diphenylmethylenepiperidino)butyrophenone oxime,
3-(4-diphenylmethylenepiperidino)-1-(2-thienyl)-1-propanone oxime,
4-(4-diphenylmethylenepiperidino)butyrophenone oxime,
4′-ethyl-4-(4-diphenylmethylpiperidino)butyrophenone oxime,
4′-fluoro-4-[4-(α-hydroxy-α-phenylbenzyl)-piperidino]butyrophenone oxime,
4′-fluoro-3-[4-(α-hydroxy-α-phenylbenzyl)piperidino]propiophenone oxime,
4-[4-(α-hydroxy-α-phenylbenzyl)piperidino]-4′-piperidinobutyrophenone oxime,
4′-bromo-4-[4-α-hydroxy-α-phenylbenzyl)-piperidino]butyrophenone oxime,
2-(4-diphenylmethylpiperidino)acetophenone oxime,
4′-ethyl-3-[4-(α-hydroxy-α-phenylbenzyl)piperidino]propiophenone oxime,
4′-diisoproplyamino-4-[(α-hydroxy-α--phenylbenzyl)piperidino]butyrophenone oxime,
4′-isopropyl-4-[4-(α-hydroxy-α-phenylbenzyl)-piperidino]butyrophenone oxime,
4′-tert-butyl-4-[4-(α-hydroxy-α-phenylbenzyl)piperidino]butyrophenone oxime,
4-(4-diphenylmethylenepiperidino)-4′-methoxybutyrophenone oxime,
and the like.

The novel compounds of this invention are useful as antihistamines, antiallergy agents and bronchodilators and may be administered alone or with suitable pharmaceutical carriers, and can be in solid or liquid form such as, for example, tablets, capsules, powders, solutions, suspensions, or emulsions.

The compounds of this invention can be administered orally, parenterally, for example, subcutaneously, intravenously, intramuscularly, intraperitoneally, by intranasal instillation or by application to mucous membranes such as that of the nose, throat, and bronchial tubes, for example, in an aersol spray containing small particles of a compound of this invention in a spray or dry powder form.

The quantity of novel compound administered will vary. Depending on the patient and the mode of administration, the quantity of novel compound administered may vary over a wide range to provide in a unit dosage of from about 0.01 to 20 milligrams per kilogram of body weight of the patient per dose to achieve the desired effect. For example the desired antihistamine, antiallergy and bronchodilator effects can be obtained by consumption of a unit dosage form such as, for example, a tablet containing 1 to 50 milligrams of a novel compound of this invention taken 1 to 4 times daily.

The solid unit dosage forms can be of the conventional type. Thus, the solid form can be a capsule which can be of the ordinary gelatin type containing a novel compound of this invention and a carrier, for example, lubricant and inert fillers such as lactose, sucrose, corn starch, and the like. In another embodiment, the novel compounds are tabletted with conventional tablet bases such as lactose, sucrose, corn starch, and the like in combination with binders such as acacia, corn starch or gelatin, disintegrating agents such as corn starch, potato starch, or alginic acid, and a lubricant such as stearic acid, or magnesium stearate.

The novel compounds may also be administered as injectable dosages by solution or suspension of the compounds in a physiologically acceptable diluent with a pharmaceutical carrier which can be a sterile liquid such as water and oils, with or without the addition of a surfactant and other pharmaceutically acceptable adjuvants. Illustrative of oils there can be mentioned those of petroleum, animal, vegetable or synthetic origin, for example, peanut oil, soybean oil, mineral oil, and the like. In general, water, saline, aqueous dextrose, and related sugar solutions, and glycols such as propylene glycol or polyethylene glycol are preferred liquid carriers, particularly for injectable solutions.

For use as aerosols the novel compounds in solution or suspension may be packaged in a pressurized aerosol container together with a gaseous or liquefied propellant, for example, dichlorodifluoromethane, dichlorodifluoromethane with dichlorodifluoroethane, carbon dioxide, nitrogen, propane, etc. with the usual adjuvants such as co-solvents, and wetting agents, as may be necessary or desirable. The compounds may also be administered in a non-pressurized form such as in a nebulizer or atomizer.

To illustrate the utility of the compounds of this invention the following tabulation indicates the amount of certain representative compounds of this invention required to reduce by 50% wheals induced by intradermal injections of 1γ of histamine into guinea pigs. Each compound was orally administered one hour prior to the histamine injection.

| Ex. No. | Compound | ED₅₀, mg./kg. |
|---|---|---|
| 1 | 4'-fluoro-4-[4-(α-hydroxy-α-phenylbenzyl) piperidino]butyrophenone oxime hydrochloride. | 5.4 |
| 2 | 4'-bromo-4-[4-α-hydroxy-α-phenylbenzyl) piperidino]butyrophenone oxime hydrochloride. | 15.4 |
| 3 | 4'-tert-butyl-4-[4-(α-hydroxy-α-phenyl-benzyl)piperidino]-butyrophenone oxime hydrochloride. | 6.2 |

The minimal amounts of the compounds of Examples 1 and 3 required to prevent aerosol antigen induced bronchial spasms and death in the guinea pig are each 2.0 milligrams per kilogram of body weight or

TABLE I

| Ex. No. | Starting material | Product |
|---|---|---|
| 6 | 4-[4-(α-hydroxy-α-phenylbenzyl)piperidino]butyrophenone hydrochloride, M.P. 193.5-195° C. | 4-[4-(α-hydroxy-α-phenylbenzyl)piperidino]butyrophenone oxime. |
| 7 | 4-[4-(α-hydroxy-α-phenylbenzyl)piperidino]-1-(2-thienyl)-1-butanone hydrochloride, M.P. 192.5-193.5° C. | 4-[4-(α-hydroxy-α-phenylbenzyl)piperidino]-1-(2-thienyl)-1-butanone oxime. |
| 8 | 4-[4-(α-hydroxy-α-phenylbenzyl)piperidino]-4'-methylbutyrophenone hydrochloride, M.P. 236-237° C. | 4-[4-(α-hydroxy-α-phenylbenzyl)piperidino]-4'-methylbutyrophenone oxime. |
| 9 | 4-[4-(α-hydroxy-α-phenylbenzyl)piperidino]-4'-piperidinobutyrophenone, M.P. 137.5-139° C. | 4-[4-(α-hydroxy-α-phenylbenzyl)piperidino]-4'-piperidinobutyrophenone oxime. |
| 10 | 4'-fluoro-2-[4-(α-hydroxy-α-phenylbenzyl)piperidino]-acetophenone hydrochloride M.P. 171-174° C. | 4'-fluoro-2-[4-(α-hydroxy-α-phenylbenzyl)piperidino]acetophenone oxime. |
| 11 | 4'-fluoro-3-[4-(α-hydroxy-α-phenylbenzyl)piperidino]-propiophenone, M.P. 250° C. | 4'-fluoro-3-[4-(α-hydroxy-α-phenylbenzyl)piperidino]propiophenone oxime. |
| 12 | 4-(4-diphenylmethylpiperidino)butyrophenone hydrochloride M.P. 163.5-164.5° C. | 4-(4-diphenylmethylpiperidino)butyrophenone oxime. |
| 13 | 4'-fluoro-4-(4-diphenylmethylpiperidino)butyrophenone hydrochloride M.P. 194-195.5° C. | 4'-fluoro-4-(4-diphenylmethylpiperidino)butyrophenone oxime. |
| 14 | 4'-fluoro-4-(4-diphenylmethylenepiperidino)-butyrophenone hydrochloride, M.P. 190-191° C. | 4'-fluoro-4-(4-diphenylmethylenepiperidino)butyrophenone oxime. |
| 15 | 4-(4-diphenylmethylenepiperidino)-1-(2-thienyl)-1-butanone hydrochloride, M.P. 132.5-134.5° C. | 4-(4-diphenylmethylenepiperidino)-1-(2-thienyl)-1-butanone oxime. |
| 16 | 4-(4-diphenylmethylenepiperidino)butyrophenone hydrochloride, M.P. 160-161.5° C. | 4-(4-diphenylmethylenepiperidino)butyrophenone oxime. |
| 17 | 4'-bromo-4-(4-diphenylmethylenepiperidino)-butyrophenone hydrochloride, M.P. 228-230° C. | 4'-bromo-4-(4-diphenylmethylenepiperidino)butyrophenone oxime. |
| 18 | 4'-tert-butyl-4-(4-diphenylmethylenepiperidino)butyrophenone hydrochloride, M.P. 223.5-225.5° C. | 4'-tert-butyl-4-(4-diphenylmethylenepiperidino)butyrophenone oxime. |

EXAMPLE 19

An illustrative composition for hard gelatin capsules is as follows:

|  | Mg. |
|---|---|
| (a) 4' - tert - butyl - 4 - [4 - (α - hydroxy - α - phenylbenzyl)piperidino]butyrophenone oxime hydrochloride | 10 |
| (b) Talc | 5 |
| (c) Lactose | 100 |

The formulation is prepared by passing the dry powders of (a) and (b) through a fine mesh screen and mixing them well. The powder is then filled into hard gelatin capsules at a net fill of 115 mg. per capsule.

EXAMPLE 20

An illustrative composition for tablet is as follows:

|  | Mg. |
|---|---|
| (a) 4' - tert - butyl - 4 - [4 - (α - hydroxy - α - phenylbenzyl)piperidino]butyrophenone oxime hydrochloride | 5 |
| (b) Starch | 43 |
| (c) Lactose | 60 |
| (d) Magnesium stearate | 2 |

The granulation obtained upon mixing the lactose with the compound (a) and part of the starch and granulated with starch paste is dried, screened, and mixed with the magnesium stearate. The mixture is compressed into tablets weighing 110 mg. each.

EXAMPLE 21

An illustrative composition for an aerosol solution is the following:

|  | Weight percent |
|---|---|
| (a) 4 - [4 - (α - hydroxy - α - phenylbenzyl)piperidino] - 4' - dimethylaminobutyrophenone oxime hydrochloride | 5.0 |
| (b) Ethanol | 35.0 |
| (c) Dichlorodifluoromethane | 60.0 |

The materials (a), (b) and (c) are packaged in 15 ml. stainless steel containers equipped with a metering valve designed to meter 0.2 grams per dose, an equivalent of 10 mg. of novel compound (a).

EXAMPLE 22

An illustrative composition for aerosol suspension is the following:

|  | Weight percent |
|---|---|
| (a) 4' - Fluoro - 4 - [4 - (α - hydroxy - α - phenylbenzyl)piperidino]butyrophenone oxime hydrochloride (particle size $<10\mu$) | 20.0 |
| (b) Sorbitan trioleate | 0.5 |
| (c) Dichlorodifluoromethane | 39.75 |
| (d) Dichlorodifluoroethane | 39.75 |

The materials (a)–(d) are packaged in 15 ml. stainless steel containers equipped with a metering valve designed to meter 50 mg. per dose, an equivalent of 10 mg. of novel compound (a).

EXAMPLE 23

An illustrative composition for an injectable suspension is the following 1 ml. ampul for an intramuscular injection.

|  | Weight percent |
|---|---|
| (a) 4-(4 - diphenylmethylenepiperidino) - 4' - dimethylaminobutyrophenone oxime hydrochloride (particle size $<10\mu$) | 1.0 |
| (b) Polyvinylpyrrolidone (M.W. 25,000) | 0.5 |
| (c) Lecithin | 0.25 |
| (d) Water for injection to make | 100.0 |

The materials (a)–(d) are mixed, homogenized, and filled into 1 ml. ampuls which are sealed and autoclaved 20 minutes at 121° C. Each ampul contains 10 mg. per ml. of novel compound (a).

EXAMPLE 24

4'-Dimethylamino-4-[4-(α-hydroxy-α-phenylbenzyl) piperidino]butyrophenone oxime

To 8 g. (0.017 mole) of 4'-dimethylamino-4-[4-(α-hydroxy-α-phenylbenzyl)piperidino]butyrophenone in about 150 ml. of pyridine was added a four fold excess of hydroxylamine hydrochloride, and the mixture was refluxed on a steam bath for about 3 hours. The pyridine was removed, and the residue was triturated with a dilute sodium hydroxide solution and extracted with ether. The ether extract was dried over anhydrous magnesium sulfate, filtered, and concentrated to a residue which was recrystallized from methanol-heptane, ethanol-water, and ethanol to give the desired product, M.P. 174–176° C.

EXAMPLE 25

4-(4-Diphenylmethylenepiperidino)-4'-methoxybutyrophenone oxime

By the procedure of Example 2, only substituting for 4'-bromo - 4 - [4-(α-hydroxy-α-phenylbenzyl)piperidino] butyrophenone hydrochloride an appropriate amount of 4-(4-diphenylmethylenepiperidino) - 4' - methoxybutyrophenone hydrochloride and recrystallizing from benzene-hexane the desired product was obtained, isolated as the free base, M.P. 88–98° C.

EXAMPLE 26

4'-Fluoro-2-[4-(α-hydroxy-α-phenylbenzyl)piperidino]-acetophenone oxime

A mixture of 8.0 g. (0.018 mole) of 4'-fluoro-2-[4-(α-hydroxy-α-phenylbenzyl)piperidino]acetophenone, 70 ml. ethanol and 70 ml. of pyridine was treated with 2.5 g. (0.036 mole) of hydroxylamine hydrochloride, in 20 ml. of ethanol and refluxed for 3 hours. The reaction mixture was cooled to room temperature, poured into ice and water, diluted to about 1750 ml. with water, and allowed to stand overnight. An oil formed which was heated with water after removal of the supernatant. The residual oil was dissolved in methylene chloride, dried over sodium sulfate, filtered, and concentrated to an oil. The residual oil was refluxed in 200 ml. of hexane to which was gradually added about 75 ml. of benzene after which the supernatant was decanted and allowed to stand overnight. A residue formed which was treated with hexane and benzene as described above. The solution was filtered and upon standing the desired product precipitated, M.P. 157–161° C.

What is claimed is:

1. A compound selected from a base of the formula

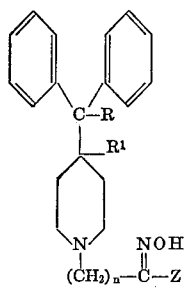

wherein R is selected from the group consisting of hydrogen or hydroxy. $R^1$ is hydrogen. or R and $R^1$ taken together form a second bond between the carbon atoms bearing R and $R^1$; $n$ is a positive whole integer of from 1 to 3; and Z is selected from the group consisting of thienyl, phenyl, substituted phenyl wherein the substituents on the substituted phenyl may be attached at the ortho, meta, or para positions of the substituted phenyl ring and are selected from the group consisting of an halogen atom, a straight or branched lower alkyl chain of from 1 to 4 carbon atoms, a lower alkoxy group of from 1 to 4 carbon atoms, a di(lower)alkylamino group, or a saturated monocyclic heterocyclic ring selected from the group consisting of pyrrolidino, piperidino, morpholino, and N-(lower)alkylpiperazino, or pharmaceutically acceptable acid addition salts thereof.

2. A compound of Claim 1 wherein each of R and $R^1$ is hydrogen.

3. A compound of Claim 1 wherein R and $R^1$ taken together form a second bond between the carbon atoms bearing R and $R^1$.

4. A compound of Claim 3 wherein $n$ is equal to 3.

5. A compound of Claim 4 which is 4-[4-(diphenylmethylene)piperidino]-4'-methoxybutyrophenone oxime or a pharmaceutically acceptable acid addition salt thereof.

6. A compound of Claim 1 wherein R is hydroxy and $R^1$ is hydrogen.

7. A compound of Claim 6 which is 4'-fluoro-2-[4-(α-hydroxy-α-phenylbenzyl)piperidino]acetophenone oxime, or a pharmaceutically acceptable acid addition salt thereof.

8. A compound of Claim 6 wherein $n$ is equal to 3.

9. A compound of Claim 8 which is 4'-fluoro-4-[4-(α-hydroxy-α-phenylbenzyl)piperidino]butyrophenone oxime or a pharmaceutically acceptable acid addition salt thereof.

10. A compound of Claim 8 which is 4'-bromo-4-[4-(α-hydroxy - α - phenylbenzyl)piperidino]butyrophenone oxime or a pharmaceutically acceptable acid addition salt thereof.

11. A compound of Claim 8 which is 4'-*tert*-butyl-4-[4-(α-hydroxy - α - phenylbenzyl)piperidino]butyrophenone oxime or a pharmaceutically acceptable acid addition salt thereof.

12. A compound of Claim 8 which is 4'-dimethylamino-4-[4-(α - hydroxy - α - phenylbenzyl)piperidino]butyrophenone oxime or a pharmaceutically acceptable acid addiiton salt thereof.

References Cited
UNITED STATES PATENTS

| | | | |
|---|---|---|---|
| 3,310,566 | 3/1967 | Freed et al. | 260—293.8 |
| 3,122,555 | 2/1964 | Janssen | 260—293.68 |
| 3,158,609 | 11/1964 | Hamilton et al. | 260—293.79 |
| 2,739,968 | 3/1956 | Sperber | 260—293.8 |

S. D. WINTERS, Assistant Examiner

U.S. Cl. X.R.

260—293.64, 293.68, 293.71, 293.78, 247.5 R, 268 PH, 240 K, 293.8; 424—248, 250, 267

UNITED STATES PATENT AND TRADEMARK OFFICE
CERTIFICATE OF CORRECTION

PATENT NO. : 3,829,433
DATED : August 13, 1974
INVENTOR(S) : Albert A. Carr, C. Richard Kinsolving, Donald R. Meyer It is certified that error appears in the above-identified patent and that said Letters Patent are hereby corrected as shown below:

Column 2, structure IV

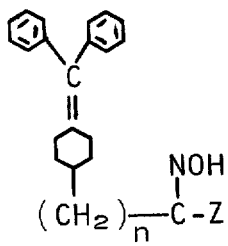    should read    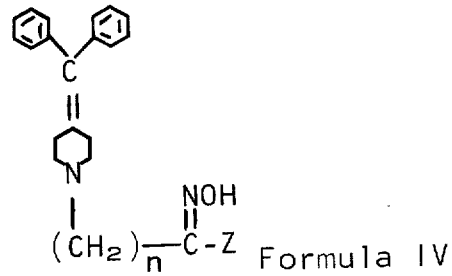

Formula IV                                Formula IV

Column 4, line 3, "4'-diisopropylamino-4-[(α" should read "4'-diisopropylamino-4-[4-(α". Column 7, Example 9, "benzyl)piperidino]-4' benzyl)piperidino]-4'-" should read "benzyl)piperidino]-4'-"; Example 18 (product) "4'-$^s$e$_r$e-butyl" should read "4'-tert-butyl". Column 9, line 12, "an oil formed which was heated" should read "an oil formed which was washed".

Signed and Sealed this twentieth Day of January 1976

[SEAL]

Attest:

RUTH C. MASON
Attesting Officer

C. MARSHALL DANN
Commissioner of Patents and Trademarks